UNITED STATES PATENT OFFICE.

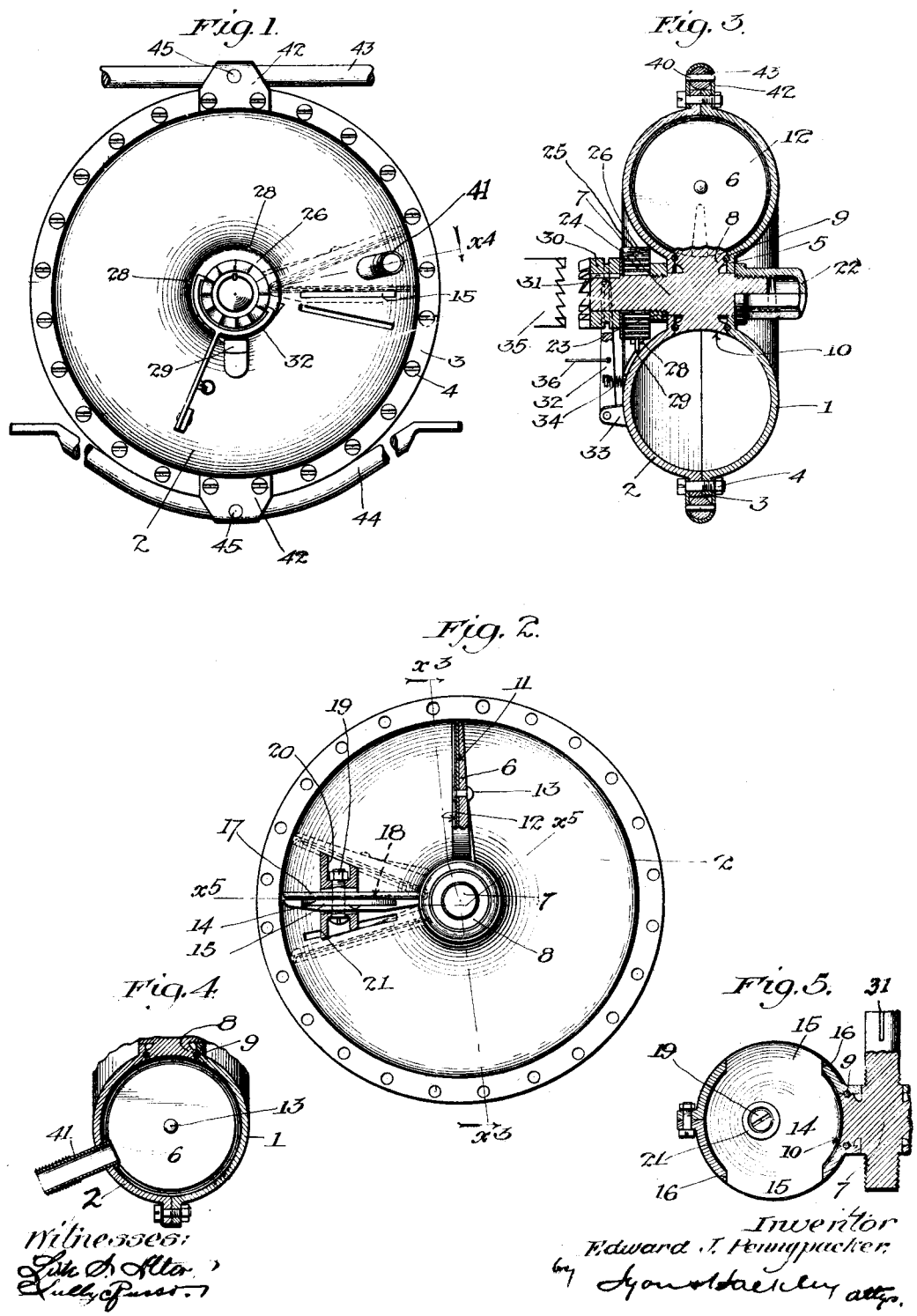

EDWARD J. PENNYPACKER, OF LOS ANGELES, CALIFORNIA, ASSIGNOR TO CLINTON L. WALKER, OF OAKLAND, CALIFORNIA.

MOTOR.

1,186,827.  Specification of Letters Patent.  Patented June 13, 1916.

Application filed October 17, 1912. Serial No. 726,255.

*To all whom it may concern:*

Be it known that I, EDWARD J. PENNYPACKER, a citizen of the United States, residing at Los Angeles, in the county of Los Angeles and State of California, have invented a new and useful Motor, of which the following is a specification.

This invention relates to motors for starting automobiles and similar engines and has for its object to improve and simplify the construction and operation of the same.

Briefly stated, the mechanism herein comprises a cylinder of novel form and construction provided with inwardly dished side walls, a stationary head removably mounted therein in grooves formed in the cylinder walls, a starter shaft extending transversely through the cylinder and provided with a hub fitting between the side walls and carrying a radial vane movable within the cylinder and normally positioned adjacent the stationary head, means for admitting compressed fluid to the cylinder between the stationary head and movable vane to move the latter around and drive the starter shaft, a spring mounted in the dished portion at one side of the cylinder and connected to the starter shaft for returning the latter to normal position where the movable vane is adjacent the stationary head, a shiftable clutch mechanism upon the starter shaft connectible with a coöperating clutch member on the engine shaft whereby the device may be substituted for the usual hand crank of the automobile, unitary means operable on its initial movement to connect the clutch members and upon its advanced movement to open the fluid supply, whereby the engine shaft is rotated to start the engine, and a screw-threaded angular nut on the front end of the starter shaft resting against the side wall of the cylinder to receive a crank for manually operating the engine shaft.

One form which my invention may assume is exemplified in the following description and illustrated in the accompanying drawings.

Referring to the drawings: Figure 1 is a rear elevation of the device. Fig. 2 is a front elevation of the device with the front cylinder member removed. Fig. 3 is a vertical section on line $x^3$—$x^3$ in Fig. 2. Fig. 4 is a section on line $x^4$—$x^4$ in Fig. 1. Fig. 5 is a section on line $x^5$—$x^5$ in Fig. 2.

The starting device comprises an annular cylinder composed of two dished members 1 and 2, having outer flanges 3, secured by screws 4. The members also have inner flanges 5 which are spaced apart from each other a suitable distance as clearly shown in Fig. 3, to permit of the direct connection of the piston 6 with the shaft 7. The shaft 7 is formed with a hub 8 which fits within the space between the inner flanges 5, and packing rings 9 are arranged between the hub 8 and flanges 5 and prevent leakage of gas from the cylinder at these joints. These packing rings 9 are concentric with the shaft 7. The outer periphery of the hub 8 is formed with a concave groove 10 which conforms to the bore radially and circumferentially of the cylinder.

The piston 6 is preferably formed integral with the hub 8 and shaft 7, and while conforming to the walls of the cylinder, does not touch the walls, leakage being prevented by means of a packing 11, which is secured to the piston 6 by a disk 12 retained by any fastening means, such as rivets 13. The packing 11 is arranged in a plane radial of the axis of the shaft 7, thereby giving the mechanism full leverage of the pressure on the piston against the shaft.

A head 14 is arranged within the cylinder and is formed with oppositely disposed segmental lugs 15, which are received in radial slots 16, formed in the cylinder members 1 and 2. This means of support positively holds the head in position and dispenses with screws, keys, or other locking devices.

Secured to the head 14 is a packing 17, there being a disk 18 retaining the packing in place and a bolt 19 passing through the head, disk and packing. On one side of the head is a bumper 20 formed of some cushioning material as, for example, rubber, and on the other side of the head is another bumper 21, both bumpers being held in place by the bolt 19 and the respective bumpers having flanged faces, the rims of which are in planes substantially radial to the axis of the shaft, so that they will act to cushion each end of the stroke of the piston. The front end of the shaft 7 is threaded and screwed thereon is a hollow nut 22, which permits the attachment of a starting crank not shown. Whenever it is desired to manually crank the engine this nut also acts to resist the end thrust of the shaft in one direction, and end thrust in the other direction being resisted by the shoulder 23, on shaft 7. A helical spring 24 has its inner end secured to the shaft 7 and its outer end is fastened to an inwardly projecting boss 25 on a hollow case 26, which is revolubly mounted on the shaft 7, and which has external teeth 28, any one of which is adapted to engage a bracket 29 secured to the cylinder member 2. The case 26 is preferably made of sheet metal and teeth 28 formed therein which have sufficient elasticity to yield and pass by the bracket 29 when the case is turned clockwise, as in Fig. 1, and when adjusted in this direction the tension of the spring is increased. To decrease the tension of the spring the case is turned in the opposite direction, which is accomplished by springing back the teeth 28 in order to permit them to pass reversely across the bracket 29.

A clutch member 30 is slidable on the end of the shaft 7 and is prevented from relative rotation by a feather 31. The clutch member is grooved and is engaged by a forked lever 32, which is pivoted to a bracket 33 supported on the cylinder member 2. A coil spring 34 normally holds the forked lever and clutch member retracted in the position shown in Fig. 3.

35 designates a clutch member on the end of the engine shaft with which the clutch member 30 is adapted to coact to turn the clutch member 35 and engine shaft clockwise. The teeth of both clutch members are beveled to permit the clutch member 30 to rotate the shaft when the starting device is being returned to normal position by the spring, or to permit the clutch member 35 to turn faster than the clutch member 30, when the engine starts.

A connection 36 between lever 32 and a control lever (not shown) is provided so that the clutch part 30 may be moved into operative relation with clutch part 35, in an obvious manner. The nipple 41 is connected to a source of air supply (not shown) for admitting air behind the piston for driving the piston clock-wise, and its shaft 7 being operatively engaged with the engine shaft as before described turns the engine shaft with it at a corresponding speed at substantially a corresponding revolution. The engine will usually be started before the complete rotation is made and this will have the effect of turning the clutch member 35 faster than the clutch member 30, so that no damage is done to the starting device, and when the piston of the starting device reaches the bumper 21 it is stopped by the bumper and stays in this position until the controlling device 37 is released, whereupon the valve 38 turns to normal position which has an opening to atmosphere to permit the air within the cylinder to exhaust, and thereupon the spring 24 acts upon the shaft 7 to turn the piston 6 back to normal position, resting against the bumper 20.

Brackets 42 are secured to the outer flanges of the starting device as shown in Fig. 1, and supporting rods 43 and 44 pass therethrough. These rods may be attached to any desired point and accordingly shaped. As shown, the upper rod 43 is straight, and the lower rod 44 curved, and the pins 45 extend through the brackets 42 and rods 43 and 44, thereby positively locking the starting device against any rotative movement which it would otherwise have were it not held, owing to the reaction against the stationary head and cylinder to which it is attached.

While I have shown and described but one form herein, it will be understood that my device is susceptible of modification and therefore changes in the construction and arrangement of the several parts of the same may be employed without departing from the spirit of my invention as disclosed in the appended claims.

What I claim is:—

1. A motor for starting engines, comprising, in combination, a cylinder formed of sheet metal in two circular members dished inwardly at their central portions and detachably connected together at their peripheries, a stationary head in said cylinder detachably held between said members, a starter shaft extending through the axis of said cylinder and connectible with the engine shaft, a radial vane on said starter shaft lying within the cylinder and movable therein and normally held adjacent to the stationary head, means on said shaft engaging the sides of the cylinder walls within and without to reinforce the same and secure them together at their central portions, and means for admitting compressed fluid to said cylinder between the stationary head and movable vane to move the latter around and drive said starter shaft.

2. A motor for starting engines, comprising, in combination, a cylinder formed of two circular members dished inwardly at their central portions and detachably connected together, a stationary head in said cylinder detachably held between said members, a starter shaft extending through the axis of said cylinder and connectible with the engine shaft, a radial vane on said starter shaft lying within the cylinder and movable therein and normally held adjacent to the stationary head, means for admitting compressed fluid to said cylinder between the stationary head and movable vane to move the latter around and drive said starter shaft, a spring on one end of said starter shaft lying within the dished portion of the adjacent cylinder member for returning the said shaft and movable vane to normal position, means for adjusting the tension of said spring, and an angular projection on the other end of said shaft to receive a crank and also lying within the dished portion of the adjacent cylinder member.

3. A motor for starting engines, comprising, in combination, a cylinder formed of thin metal in two circular halves, detachably connected together, a stationary head in said cylinder, segmental lugs on said head, said cylinder members being provided with slots in their sides to receive the segmental lugs, an enlarged leather disk secured to said stationary head and having its periphery turned toward the high pressure side, a starter shaft extending through the axis of said cylinder and connectible with the engine shaft, a radial vane on said starter shaft lying within the cylinder and normally held adjacent to the stationary head, and means for admitting compressed fluid to said cylinder between the stationary head and vane to move the latter around and drive said starter shaft.

4. A motor for starting engines, comprising, in combination, a cylinder formed of sheet metal in two circular halves, means on the peripheries of said halves for holding the same detachably together, a stationary head in said cylinder, a starter shaft extended axially through said cylinder and connectible with the engine shaft, a hub on the intermediate portion of said starter shaft lying between and engaging the interior sides of said cylinder and supporting the same, screw-threaded means on the opposite ends of said starter shaft engaging the outer sides of said cylinder to support the same, a radial vane carried on the hub of said starter shaft movable within the cylinder and normally held adjacent to the stationary head, and means for admitting compressed fluid to said cylinder between the stationary head and vane for moving the latter around to drive the starter shaft.

5. A motor for starting engines, comprising, in combination a tubular, ring-shaped member formed of circular halves, convexo-concave at their rim portion and concavo-convex at their central portion, each formed of metal of such thinness as to require external support, and provided with peripheral flanges, securing means for connecting said flanges together, a stationary head in said member carried in radial slots formed in said halves, a starter shaft extending axially through said member and provided with a hub portion engaging at its ends with the interior sides of said halves and supporting the same, said shaft being connectible with the engine shaft, a radial vane carried by said hub, means on said starter shaft engaging the exterior sides of said halves to support the same, and means for admitting compressed fluid to said member between the stationary head and vane to drive the latter around and rotate the shaft.

6. A shaft, a circular cylinder concentric with the shaft, the inner wall of the cylinder having an annular groove, a hub on the shaft filling said groove, a piston on said hub lying within the cylinder, a stationary head within the cylinder, and means for admitting an operating fluid into the cylinder, clips secured to the cylinder, supporting rods extending through the clips, and a pin through each clip and supporting rod.

In testimony whereof I have hereunto set my hand at Los Angeles, California, this 12th day of October, 1912.

EDWARD J. PENNYPACKER.

In presence of—
MARTHA M. LANGE,
M. E. BLASDEL.

Copies of this patent may be obtained for five cents each, by addressing the "Commissioner of Patents, Washington, D. C."